United States Patent [19]

Rice

[11] 3,774,843
[45] Nov. 27, 1973

[54] SNOW GUN
[76] Inventor: Bruce A. Rice, 6 Dorset Dr., Canandiaqua, N.Y.
[22] Filed: Jan. 22, 1973
[21] Appl. No.: 325,576

Related U.S. Application Data
[63] Continuation-in-part of Ser. No. 215,589, Jan. 5, 1972, abandoned.

[52] U.S. Cl. .................. 239/14, 239/402, 239/405
[51] Int. Cl. ............................................. F25c 3/04
[58] Field of Search ............... 239/2.5, 14, 402–405, 239/470, 434.5

[56] References Cited
UNITED STATES PATENTS

| | | | |
|---|---|---|---|
| 2,358,386 | 9/1944 | Doll | 239/402 |
| 3,304,012 | 2/1967 | Sem | 239/405 X |
| 3,494,559 | 2/1970 | Skinner | 239/2.5 |
| 3,692,244 | 9/1972 | Lincoln | 239/434.5 |

Primary Examiner—M. Henson Wood
Assistant Examiner—John J. Love
Attorney—George W. Shaw et al.

[57] ABSTRACT

A snow gun directs high pressure air through an input nozzle axially into a mixing chamber, and directs water into a vortex chamber surrounding the air nozzle so that the water spins in a vortex around the air input nozzle. The spinning water flows into the mixing chamber to spin around the periphery of the mixing chamber and around the air nozzle blast. This thoroughly mixes the air and water, and the mixture is directed through an output nozzle into the atmosphere. The output nozzle has a generally cylindrical bore having an inside diameter about one-half the inside diameter of the mixing chamber with the nozzle bore length being approximately equal to the nozzle bore diameter, and a conical surface leads from the mixing chamber to the nozzle bore and is inclined 25° – 30° from the axis of the mixing chamber.

11 Claims, 3 Drawing Figures

3,774,843

SNOW GUN

RELATED APPLICATIONS

This application is a continuation-in-part of my parent application Ser. No. 215,589, filed Jan. 5, 1972, entitled SNOW GUN, and abandoned upon the filing of this application.

THE INVENTIVE IMPROVEMENT

The invention involves recognition of a better way to use the energy of pressurized air and water delivered to a snow gun to produce a more finely divided and better mixed combination of air and water directed out into the atmosphere to make snow. The invention also includes a simple and efficient snow gun for practicing the inventive concept. The invention aims at greater efficiency and reliability, more and better snow for the air and water used, and trouble-free and reliable operation.

SUMMARY OF THE INVENTION

The inventive snow gun has a generally cylindrical mixing chamber and an air input nozzle oriented for directing high pressure air axially into the input end of the mixing chamber. A vortex chamber is coaxial with the mixing chamber and surrounds the air input nozzle adjacent the input end of the mixing chamber. A water input line is oriented for directing water generally tangentially into the vortex chamber and generally perpendicular to the axis of the vortex chamber to form a vortex of water around the input nozzle in the vortex chamber. The vortex chamber opens into the input end of the mixing chamber so the water enters and spins around the periphery of the mixing chamber and around the air blast from the input nozzle. An output nozzle has a generally cylindrical nozzle bore for directing the air and water mixture from the output end of the mixing chamber out into the atmosphere. The nozzle bore has an inside diameter substantially less than the inside diameter of the mixing chamber, and has a length approximately equal to the nozzle bore diameter. The nozzle has a conical surface leading from the inside surface of the mixing chamber to the nozzle bore, and the conical surface is inclined 25°–30° from the axis of the mixing chamber.

DRAWINGS

DETAILED DESCRIPTION

Figure 1:
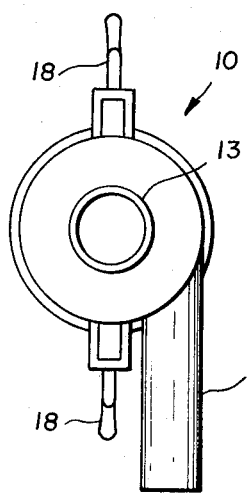
FIG. 1 is a partially schematic, rear elevational view of a preferred embodiment of the inventive snow gun.
Figure 2:
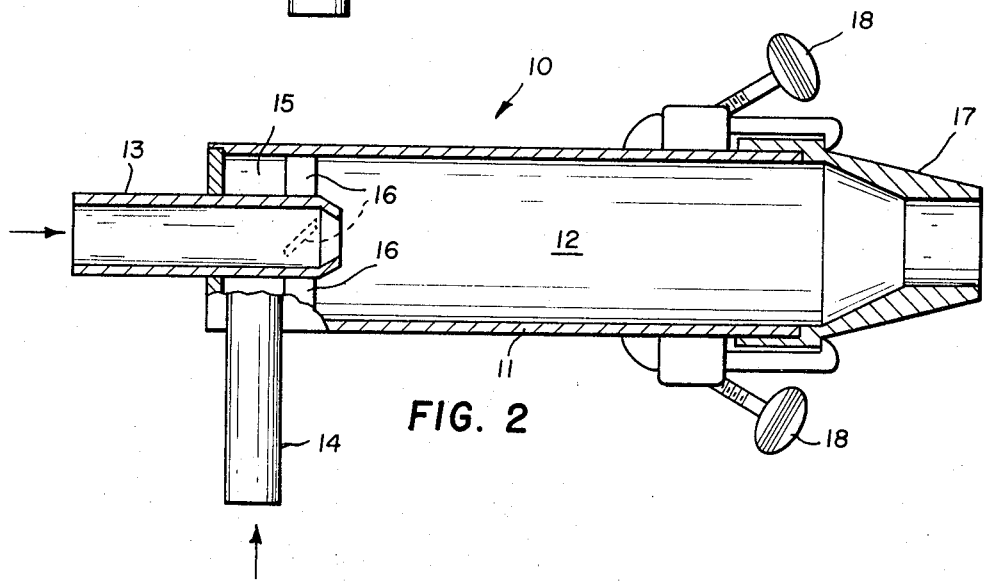
FIG. 2 is a partially sectioned, plan view of the gun of FIG. 1.

FIGS. 1 and 2 show one preferred embodiment of the inventive snow gun 10 having a main barrel 11 forming a mixing chamber 12. An air input nozzle 13 directs high pressure air axially into mixing chamber 12 at the rear of gun 10 and water is directed into gun 10 through water input line 14. A water input vortex chamber 15 surrounds air input nozzle 13, and water input line 14 is oriented preferably perpendicular to air input nozzle 13 and preferably tangentially to vortex chamber 15, so that water from pipe 14 spins rapidly around air input nozzle 13 in chamber 15.

Vanes 16 support the forward end of air input nozzle 13 and extend between nozzle 13 and the wall of mixing chamber 11. Vanes 16 allow the water vortex from vortex chamber 15 to move forward into chamber 12 with as little interference as possible. Hence, vanes 16 are preferably either relatively thin pins or flat vanes oriented to align with the direction of water flow. The spinning vortex of water from vortex 15 then tends to spin around the periphery of mixing chamber 12 around a high velocity air blast from nozzle 13. The turbulence and velocity of the air blast expanding in chamber 12 breaks up the spinning water in a mixing process that continues along the length of mixing chamber 12 until the water is finally divided into drops and thoroughly mixed with the air.

An output nozzle 17 directs the air and water mixture from chamber 12 out into the atmosphere where the water freezes to form snow. Nozzle 17 is preferably interchangeable with other nozzles of different diameters, and is preferably held to barrel 11 by clamp means 18. Generally, larger nozzles can be used for lower temperatures and humidities, and smaller nozzles are preferred for high temperatures and humidities.

The volumetric flow capacity of air input nozzle 13 is preferably about one-half the volumetric flow capacity of mixing chamber 12. Various sizes of air and water input lines can be used with the inventive gun by scaling up or down.

Part of the reason for the success of the inventive snow gun is in making optimum use of the water energy for cooling and breaking up the water for a better mix with the air blast. Prior art snow guns have relied too heavily on the energy of the pressurized air to break the water into drops and mix it thoroughly with the air, and much of the water energy was wasted or misused. By spinning the incoming water in a vortex around the air nozzle and around the air mixing chamber, a thorough and efficient mixing occurs and results in substantially better performance.

Figure 3:
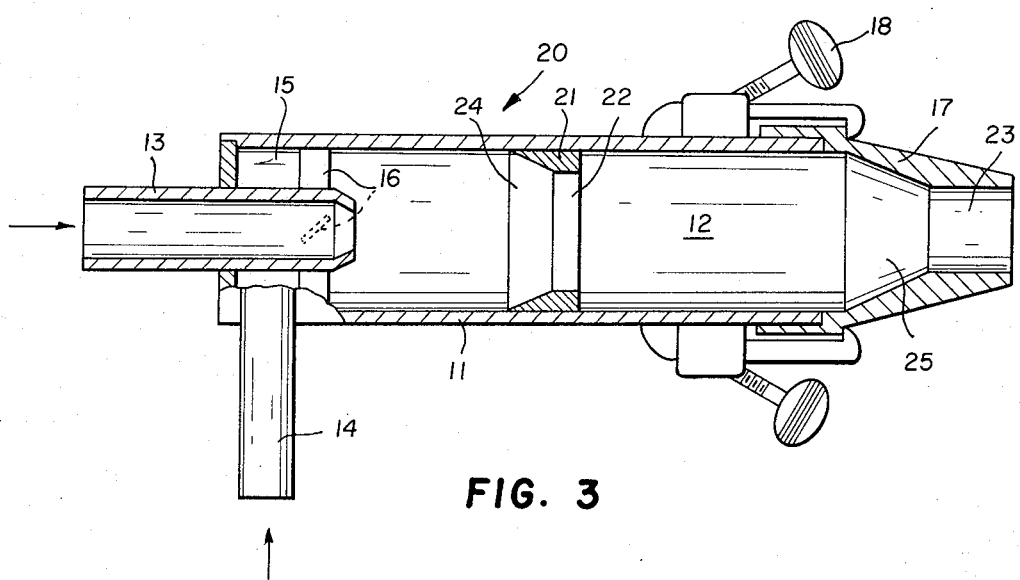
FIG. 3 is a partially sectioned, plan view of an alternative preferred embodiment of the gun of FIG. 1.

Experience with the invention since the parent application was filed has resulted in several improvements explained below, and another preferred embodiment shown in FIG. 3. Gun 20 of FIG. 3 is the same as gun 10 as shown in FIG. 2, except for the addition of a converging ring 21 arranged about in the middle of mixing chamber 12. Ring 21 has an inside surface 22 a little smaller than the inside diameter of mixing chamber 12, and a little larger than bore 23 of nozzle 17. For example, for a mixing chamber 12 having an inside diameter of 3 inches, inside surface 22 of ring 21 preferably has a diameter of about 2 ⅛ inches, and bore 23 of nozzle 17 has an inside diameter of 1 ½ inches or 1 ⅜ inches. Of course, these dimensions have some latitude range and can be varied under different circumstances.

Ring 21 also has a conical surface 24 leading from the inside surface of mixing chamber 12 to inside surface 22 of ring 21 as illustrated, and surface 24 is angled from 25° – 30° from the axis of chamber 12 as illustrated. A similar conical surface 25 leading from the inside wall of chamber 12 to the nozzle bore 23 of nozzle 17 is also inclined from 25° – 30° from the axis of chamber 12. The correct inclination of surfaces 24 and 25 has been found to produce optimum air and water mixing without allowing finely divided water drops to recombine into larger drops that drip or stream outward from nozzle 17 as water.

Convergent ring 21 enhances and improves the water and air mixing within chamber 12 by converging inward the flow of water and air along the wall of chamber 12. Ring 21 reduces the trajectory of the gun somewhat, but allows snow to be made with a lower ratio of air to water. For example, under the same given set of circumstances, a gun without ring 21 could make optimum snow with a mixture of 6 parts air to 1 part water and have a full range trajectory, and the same gun with ring 21 would require only 4 parts air to 1 part water and have a slightly reduced trajectory. Since compressed air at the snow making site is costly, a gun having converging ring 21 has many advantages. The present market has substantial needs for guns both with and without converging rings 21.

The 25° – 30° incline from the axis of chamber 12 for surface 25 of nozzle 17 applies whether or not converging ring 21 is used. Also, experience has shown that the bore 23 of nozzle 17 should have a length about equal to its diameter. Furthermore, bore 23 has an inside diameter preferably about one-half the inside diameter of chamber 12.

Vortex chamber 15 has been found to have a substantial advantage in pre-cooling the water input. Line 14 directs the water input approximately tangent to chamber 15 and perpendicular to the axis of barrel 11 so that it swirls rapidly in a vortex in chamber 15. According to the Hilsh tube effect, the higher energy molecules in the vortex in chamber 15 tend toward the outside of the vortex where they lose heat energy to the atmosphere through the cooling wall of barrel 11. The vortex in chamber 15 the pre-cools the input water to enhance the snow making capacity of guns 10 or 20. This cooling effect has been measured in practice as a 4°F temperature drop between water in line 14 and water passing vanes 16. The constant input of water through line 14 quickly moves the vortex water past vanes 16 and in a swirling or spiral motion in chamber 12, but the initial vortex effect achieved in chamber 15 is still sufficient for a substantial temperature drop increasing the snow making capacity of the gun.

The inventive gun either with or without converging ring 21 makes snow at a rapid rate in economically favorable ratios of air to water, avoids dripping or streaming water from the nozzle and forms better quality snow at high temperatures than prior art guns. At the same time, it is simple, sturdy, reliable, convenient and easy to operate.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate that nozzles can be interchanged and held in place in many ways, different mounts are usable with the inventive gun, different air and water connection lines are possible, and nozzles, vanes, gun barrels, etc., can be made in many different ways and given different shapes within the spirit of the invention.

I claim:

1. A snow gun comprising:
  a. a generally cylindrical mixing chamber;
  b. an air input nozzle oriented for directing high-pressure air axially into the input end of said mixing chamber;
  c. a vortex chamber coaxial with said mixing chamber and surrounding said air input nozzle adjacent said input end of said mixing chamber;
  d. a water input line oriented for directing water generally tangentially into said vortex chamber and generally perpendicular to the axis of said vortex chamber to form a vortex of water around said air input nozzle in said vortex chamber;
  e. said vortex chamber opening into said output end of said mixing chamber so said water enters and spins around the periphery of said mixing chamber and around the air blast from said air input nozzle;
  f. an output nozzle having a generally cylindrical nozzle bore for directing the air and water mixture from the mixing chamber out into the atmosphere;
  g. said nozzle bore having an inside diameter substantially less than the inside diameter of said mixing chamber and having a length approximately equal to said nozzle bore diameter;
  h. said nozzle having a conical surface leading from the inside surface of said mixing chamber to said nozzle bore; and
  i. said conical surface being inclined 25° – 30° from the axis of said mixing chamber.

2. The snow gun of claim 1 wherein said vortex chamber has the same inside diameter as said mixing chamber.

3. The snow gun of claim 1 wherein said inside diameter of said nozzle bore is approximately one-half said inside diameter of said mixing chamber.

4. The snow gun of claim 1 including a plurality of vanes between said air input nozzle and said mixing chamber, said vanes being generally aligned with the flow of said water into said mixing chamber.

5. The snow gun of claim 4 wherein said vanes are oriented at about 45° to the axis of said mixing chamber.

6. The snow gun of claim 1 wherein the volumetric flow capacity of said air input nozzle is approximately one-half the volumetric flow capacity of said mixing chamber.

7. The snow gun of claim 1 wherein said vortex chamber has the same inside diameter as said mixing chamber, and said inside diameter of said nozzle bore is approximately one-half said inside diameter of said mixing chamber.

8. The snow gun of claim 7 including a plurality of vanes between said input nozzle and said mixing chamber, said vanes being oriented at about 45° to the axis of said mixing chamber for generally aligning with the flow of said water into said mixing chamber.

9. The snow gun of claim 1 including a converging ring around the inside of the middle region of said mixing chamber, said ring having an inside surface with a diameter larger than said inside diameter of said nozzle bore, and having a conical surface leading from said inside surface of said mixing chamber to said inside surface of said ring and inclined from 25° to 30° from the axis of said mixing chamber.

10. The snow gun of claim 9 wherein said vortex chamber has the same inside diameter as said mixing chamber, and said inside diameter of said nozzle bore is approximately one-half said inside diameter of said mixing chamber.

11. The snow gun of claim 10 including a plurality of vanes between said input nozzle and said mixing chamber, said vanes being oriented at about 45° to the axis of said mixing chamber for generally aligning with the flow of said water into said mixing chamber.

* * * * *